Patented Nov. 1, 1932

1,885,834

UNITED STATES PATENT OFFICE

ALPHONS O. JAEGER, OF MOUNT LEBANON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

PRODUCTION OF MONOCARBOXYLIC ACIDS AND THEIR DERIVATIVES

No Drawing. Application filed July 29, 1930. Serial No. 471,594.

This invention relates to the production of monocarboxylic acids and their derivatives from the corresponding polycarboxylic acids, and more particularly to the production of benzoic acid from phthalic acid.

In the past it has been proposed to produce benzoic acid from phthalic acid by passing a mixture containing 2 mols of calcium phthalate and 1 mol of calcium hydroxide together with a weight of calcium carbonate equal to the combined weight of the phthalate and hydroxide through narrow heated tubes. This procedure is described in the patent to Fairweather, Beckett & Thomas No. 1,727,102 dated September 3, 1929. This process does not give good yields of calcium benzoate and I have found that the reason why this process is unsatisfactory lies in the fact that it uses the theoretical amount of calcium hydroxide. According to the present invention I use an excess of strong base. Much better yields are obtained, and I believe that the reason is to be found in the fact that even under the best conditions a certain amount of the calcium benzoate formed is decomposed to benzol and carbon dioxide or to other decomposition products. This further decomposition results in the evolution of additional quantities of carbon dioxide which react with the calcium hydroxide present and neutralizes considerable quantities of the calcium hydroxide so that there is insufficient base to react with the remaining calcium phthalate. Possibly also the excess of one of the reacting ingredients is helpful in accordance with the mass action law, but this factor is probably of much less importance than the neutralization by carbon dioxide from the decomposition products since when an excess of calcium hydroxide or other strong base is used which is sufficient to unite with all the carbon dioxide formed by the decomposition of small amounts of calcium benzoate a big increase in yield is obtained. Still larger excesses of strong base while they continue to have a slight improving effect on the yield do not show any such marked increase as the first 10 percent of excess. This indicates that the carbon dioxide neutralization factor is by far the most important effect in the present invention. However, it is impossible to determine exactly what is happening in a high temperature reaction such as that of the present invention, and it is not intended that the invention should be limited to any particular theory of action, the above explanation being given as the most probable without limiting the invention thereto.

The process is generally applicable to all transformations of polycarboxylic acid salts to monocarboxylic acid salts including not only the production of benzoates from phthalates but naphthoates from naphthalates, propionates from succinates, etc. The temperatures in general fall within the same range as those employed in the process of the Fairweather patent supra and the present invention is not limited to any new temperature or temperature range. The process may be carried out in narrow heated tubes of the Fairweather patent or in the improved types of apparatus described in my co-pending applications Serial No. 468,779 filed July 18, 1930, Serial No. 469,540 filed July 21, 1930, and Serial No. 470,823 filed July 26, 1930; the co-pending application of F. A. Canon Serial No. 469,670 filed July 22, 1930; and the co-pending application of W. F. Caldwell Serial No. 473,873 filed Aug. 8, 1930; and the co-pending applications of J. E. Jewett Serial No. 470,856 filed July 26, 1930 and Serial No. 473,360 filed Aug. 6, 1930.

It is desirable, particularly where the apparatus used does not consist of narrow compartments which are maintained completely full, to maintain a protective atmosphere to prevent decomposition during reaction. Any suitable protecting atmosphere may be used such as an inert gas, for example, nitrogen, or, if desired, a reducing atmosphere may be used such as hydrogen, hydrocarbon vapors, and the like; steam may also be used. When hydrogen is used, particularly with salts of the polycarboxylic acid and reducing metals such as copper, nickel, zinc, and the like, aldehydes may be obtained under suitable conditions. The production of aldehydes or acids by carrying out the process in a reducing atmosphere is not claimed per se in the present application, this being the subject matter of my co-pending application Serial No. 359,722 filed May 1, 1929.

The excess of strong base may be the same as that normally entering into the reaction or it may be a different base. Thus, for example, if the reaction is between calcium phthalate and calcium hydroxide the excess base may be additional calcium hydroxide or it may be sodium or potassium hydroxide or a mixture of sodium and calcium hydroxides. Since the function of the excess is primarily to neutralize carbon dioxide given off, any base sufficiently strong to bring about this effect may be used. This gives an added flexibility to the process, although where calcium is used it is usually cheaper to employ calcium hydroxide in excess rather than to use a more expensive alkali. The excess should ordinarily be from 10 to 35%, or larger excesses may be used, but there is no increased yield with larger excesses. When the excess is less than 10%, the increase in yield drops off rather sharply although any substantial excess over the theoretical amount required brings about noticeable improvements.

While the use of alkaline earth metal salts of polycarboxylic acids is desirable from an economical standpoint because of the cheapness of these bases and the process gives excellent yields with such bases, it should be understood that it is in no sense limited thereto and other strong bases may be used such as, for example, sodium, potassium or other alkali metal, and various combined reactions may be used, for example, employing an alkali metal salt of the polycarboxylic acid with an alkaline earth metal hydroxide or vice versa.

The reaction may be carried on with or without a diluent such as calcium carbonate, which is described in the Fairweather patent. Where very accurate temperature is possible, as in some of the improved apparatus described in the patent applications referred to above, the amount of diluent may be very greatly decreased and in some cases even entirely eliminated. I do not claim per se the reduction or elimination of diluent as this forms the subject matter of the co-pending application of L. C. Daniels Serial No. 474,877 filed Aug. 12, 1930, but it should be understood, of course, that preferably an excess of strong base which forms the subject matter of the present invention may be used with a reduction or elimination of the diluent, thus combining the advantages of the present invention with those of the invention of Daniels' application above referred to.

The invention will be described in greater detail in connection with the following specific examples.

*Example 1*

A mixture containing 2 mols of calcium phthalate, 1.2 mols of calcium hydroxide and a weight of calcium carbonate equal to two-thirds of the weight of the calcium phthalate and calcium hydroxide is intimately mixed in the form of a fine powder and is passed through a heated zone, the temperature of which is maintained between 410–450° C. and preferably maintained at about 437° C. The time of heating may vary from 15 to 200 minutes. With efficient temperature control as is, for example, possible in the efficient apparatus described in the co-pending applications referred to above, thirty minutes of heat suffices, and a conversion of from 85 to 95% is obtained. The residue consists of about equal parts of unreacted calcium phthalate and waste material such as benzol, charred material, and the like.

A comparison is made by using 1 mol of calcium hydroxide instead of 1.2 mols as described in the prior art; the yields under the same conditions will vary from about 50% to around 75%, being extremely erratic even when an efficient temperature control is used. The reason for this erratic behavior is probably to be found in the fact that neutralization of calcium hydroxide by excess carbon dioxide is apt to proceed very rapidly and wide fluctuations result.

If a smaller excess is used, for example 1.1 mol of calcium hydroxide, yields up to 80% under favorable circumstances are obtained, the reaction being much more reliable than when no excess is used. If an excess much greater than 20% is used the yields improve to some extent but more slowly.

Similar results are obtained when a reaction mixture containing 1 mol of calcium hydroxide and .2 mol sodium hydroxide is used.

In a similar manner calcium naphthalate or other alkaline earth metal naphthalate can be transformed into the corresponding naphthoate, the yields being similar.

*Example 2*

A mixture as described in Example 1 is heated in an atmosphere of hydrogen. The yields are several percent better than when no reducing atmosphere is used. If zinc, nickel or coper phthalate is substituted for calcium phthalate considerable proportions of benzaldehydes are obtained, depending upon the temperature. The aldehyde can, of course, be very easily separated from the benzoate because it is volatile and is evolved during the reaction. When the aldehyde is produced the excess of base can be slightly decreased without injuriously effecting the yield, there being no noticeable falling off when the excess is cut from about 20 to 15%.

The process may be carried out with nitrogen as a protecting atmosphere where the apparatus is such that any portion of the reaction material is exposed, or steam may be used. A mixture of nitrogen and steam are also effective.

Instead of salts of unsubstituted polycarboxylic acids, those of substituted acids may be used, for example chlorphthalates, etc.

What is claimed as new is:

1. A method of transforming a metal salt of a polycarboxylic acid to that of the corresponding monocarboxylic acid, which comprises subjecting a mixture containing the metal salt of the polycarboxylic acid and a strong inorganic base, the inorganic base being in at least 10% excess of the amount theoretically required for the reaction, at reaction temperatures of 410–450° C.

2. A method of transforming a metal salt of a polycarboxylic acid to that of the corresponding monocarboxylic acid, which comprises subjecting a mixture containing the metal salt of the polycarboxylic acid, a strong inorganic base and an inert diluent, the inorganic base being in at least 10% excess of the amount theoretically required for the reaction, at reaction temperatures of 410–450° C.

3. A method of transforming a metal phthalate to a benzoate, which comprises subjecting a mixture containing the metal phthalate and a strong inorganic base, the inorganic base being in at least 10% excess of the amount theoretically required for the reaction, at reaction temperatures of 410–450° C.

4. A method of transforming a metal phthalate to a benzoate, which comprises subjecting a mixture containing the metal phthalate, a strong inorganic base and an inert diluent, the inorganic base being in at least 10% excess of the amount theoretically required for the reaction, at reaction temperatures of 410–450° C.

5. A method of transforming a phthalate to a benzoate, which comprises subjecting a mixture containing an alkaline earth metal phthalate and a strong inorganic base, the strong inorganic base being in at least 10% excess of the amount theoretically required for the reaction, at reaction temperatures of 410–450° C.

6. A method of transforming a phthalate to a benzoate, which comprises subjecting a mixture containing an alkaline earth metal phthalate, a strong inorganic base and an inert diluent, the strong inorganic base being in at least 10% excess of the amount theoretically required for the reaction, at reaction temperatures of 410–450° C.

7. A method of transforming a phthalate to a benzoate, which comprises subjecting a mixture containing an alkaline earth metal phthalate and an alkaline earth metal hydroxide, the alkaline earth metal hydroxide being more than 10% in excess of the amount theoretically required for the reaction, at reaction temperatures of 410–450° C.

8. A method of transforming a phthalate to a benzoate, which comprises subjecting a mixture containing an alkaline earth metal phthalate, an alkaline earth metal hydroxide and an inert diluent, the alkaline earth metal hydroxide being more than 10% in excess of the amount theoretically required for the reaction, at reaction temperatures of 410–450° C.

9. A method according to claim 1, in which the mixture contains more than one inorganic base.

10. A method according to claim 2, in which the mixture contains more than one inorganic base.

11. A method according to claim 3, in which the mixture contains more than one inorganic base.

12. A method according to claim 4, in which the mixture contains more than one inorganic base.

13. A method according to claim 5, in which at least part of the excess is an alkali metal base.

14. A method according to claim 6, in which at least part of the excess is an alkali metal base.

15. A method of producing a benzoate from a phthalate, which comprises subjecting a mixture containing an alkali metal phthalate and an alkali metal hydroxide in the proportion of 2 mols phthalate to about 1.2 mols hydroxide admixed with an alkali metal carbonate as a diluent to reaction temperatures of 410–450° C.

16. A method of transforming a metal salt of a polycarboxylic acid to that of the corresponding monocarboxylic acid which comprises subjecting a mixture containing the metal salt of the polycarboxylic acid and a strong inorganic base, to heating at temperatures sufficiently high to cause decomposition of the polycarboxylic acid salt into a major portion of the corresponding monocarboxylic acid salt and a minor portion of the corresponding hydrocarbon, the strong inorganic base being present in sufficient excess over the amount theoretically required for the reaction to react with all the carbon dioxide produced.

Signed at Pittsburgh, Pennsylvania, this 12th day of July, 1930.

ALPHONS O. JAEGER.